US009181041B2

(12) United States Patent
Broers et al.

(10) Patent No.: US 9,181,041 B2
(45) Date of Patent: Nov. 10, 2015

(54) BUFFER CONVEYOR HAVING PARALLEL TRACKS

(75) Inventors: Johannes Wilhelmus Broers, Oosterblokker (NL); Wouter Balk, Baambrugge (NL)

(73) Assignee: Specialty Conveyor B.V., Zwaag (NL)

( * ) Notice: Subject to any disclaimer, the term of this patent is extended or adjusted under 35 U.S.C. 154(b) by 942 days.

(21) Appl. No.: 13/123,796

(22) PCT Filed: Oct. 15, 2009

(86) PCT No.: PCT/EP2009/063518
§ 371 (c)(1),
(2), (4) Date: Jul. 14, 2011

(87) PCT Pub. No.: WO2010/043692
PCT Pub. Date: Apr. 22, 2010

(65) Prior Publication Data
US 2011/0259711 A1    Oct. 27, 2011

(30) Foreign Application Priority Data
Oct. 15, 2008 (NL) ..................................... 2002100

(51) Int. Cl.
*B65G 21/18* (2006.01)
*B65G 47/46* (2006.01)
*B65G 47/51* (2006.01)

(52) U.S. Cl.
CPC ............ *B65G 47/5113* (2013.01); *B65G 21/18* (2013.01); *B65G 2207/24* (2013.01)

(58) Field of Classification Search
None
See application file for complete search history.

(56) References Cited

U.S. PATENT DOCUMENTS

| 1,910,241 | A | 5/1933 | Chapman |
| 3,983,989 | A | 10/1976 | Wahren |
| 4,413,724 | A | 11/1983 | Fellner |
| 4,653,631 | A | 3/1987 | Heybourn et al. |
| 4,893,708 | A | 1/1990 | Machacek |
| 4,944,162 | A | 7/1990 | Lang et al. |
| 5,105,934 | A | 4/1992 | Cawley |

(Continued)

FOREIGN PATENT DOCUMENTS

| DE | 3444132 | 6/1986 |
| DE | 10312695 | 10/2004 |

(Continued)

OTHER PUBLICATIONS

Office Action for U.S. Appl. No. 12/598,692, filed Nov. 3, 2009, mailed Jan. 5, 2012, 9 pages.

(Continued)

*Primary Examiner* — Kavel Singh
(74) *Attorney, Agent, or Firm* — Steven M. Koehler; Westman, Champlin & Koehler, P.A.

(57) ABSTRACT

A conveyor for buffering products comprises at least first and second drivable curved conveyor parts, which are spaced from each other in horizontal direction. At least, the first conveyor part has at least an inner track and an outer track, wherein the outer track is adjacent to the inner track and disposed at the outside bend side of the inner track. The second conveyor part has at least a second conveyor part track, wherein one end of the outer track of the first conveyor part is coupled to one end of the second conveyor part track. An other end of the second conveyor part track is coupled to one end of the inner track of the first conveyor part. The first and second conveyor parts are at least partly helically-shaped.

26 Claims, 10 Drawing Sheets

(56) References Cited

U.S. PATENT DOCUMENTS

| | | | |
|---|---|---|---|
| 5,191,267 A | 3/1993 | Machacek | |
| 5,259,302 A | 11/1993 | Chen | |
| 5,291,987 A | 3/1994 | Zink | |
| 5,335,590 A | 8/1994 | Crump et al. | |
| 5,348,436 A | 9/1994 | Hogenkamp et al. | |
| 5,413,213 A * | 5/1995 | Golz et al. | 198/778 |
| 5,447,223 A | 9/1995 | Dasgupta | |
| 5,490,589 A | 2/1996 | Golz | |
| 5,664,661 A | 9/1997 | Maier | |
| 5,772,005 A | 6/1998 | Hansch | |
| 5,833,045 A | 11/1998 | Osti | |
| 5,974,682 A | 11/1999 | Akimoto | |
| 6,016,904 A | 1/2000 | Hammock | |
| 6,065,463 A | 5/2000 | Martin | |
| 6,092,641 A | 7/2000 | Draghetti | |
| 6,206,947 B1 | 3/2001 | Evans | |
| 6,241,074 B1 | 6/2001 | Steeber | |
| 6,244,168 B1 | 6/2001 | Van de Vorst et al. | |
| 6,247,922 B1 * | 6/2001 | Kuenen | 432/143 |
| 6,371,275 B1 | 4/2002 | Terrell et al. | |
| 6,394,261 B1 | 5/2002 | DeGennaro | |
| 6,523,677 B1 | 2/2003 | DeGennaro et al. | |
| 6,658,993 B2 | 12/2003 | Kuenen | |
| 6,666,322 B2 | 12/2003 | Biondi et al. | |
| 6,725,674 B1 | 4/2004 | Kamm et al. | |
| 6,725,998 B2 | 4/2004 | Steeber et al. | |
| 7,032,742 B2 | 4/2006 | Hartness et al. | |
| 7,107,899 B2 | 9/2006 | Nothum, Jr. | |
| 7,163,099 B2 | 1/2007 | Mueller | |
| 7,165,670 B2 | 1/2007 | Shefet et al. | |
| 7,178,662 B2 | 2/2007 | Olsson | |
| 7,191,896 B2 | 3/2007 | Hartness et al. | |
| 7,240,788 B2 | 7/2007 | Belz et al. | |
| 7,252,189 B2 | 8/2007 | Yagi | |
| 7,299,589 B2 | 11/2007 | Campbell et al. | |
| 7,331,445 B2 | 2/2008 | Roland | |
| 7,374,392 B2 | 5/2008 | Biondi et al. | |
| 7,775,344 B2 * | 8/2010 | Balk | 198/778 |
| 7,963,389 B2 | 6/2011 | Broers et al. | |
| 8,011,496 B2 | 9/2011 | Segar et al. | |
| 8,042,676 B2 | 10/2011 | Balk | |
| 8,328,004 B2 | 12/2012 | Balk | |
| 2006/0131139 A1 | 6/2006 | Olsson | |
| 2008/0308386 A1 | 12/2008 | Balk | |
| 2010/0096243 A1 | 4/2010 | Balk | |
| 2010/0140054 A1 | 6/2010 | Broers | |
| 2011/0174596 A1 | 7/2011 | Johnson | |
| 2011/0259711 A1 | 10/2011 | Broers et al. | |
| 2012/0103762 A1 | 5/2012 | Balk | |

FOREIGN PATENT DOCUMENTS

| | | |
|---|---|---|
| DE | 102004007590 | 9/2005 |
| DE | 102006025520 | 12/2007 |
| EP | A 0538742 | 4/1993 |
| EP | 0814038 | 12/1997 |
| EP | 1389595 | 2/2004 |
| EP | 1534614 | 6/2005 |
| EP | 2039626 | 3/2009 |
| FR | 2769010 | 4/1999 |
| GB | 1084200 | 8/1917 |
| GB | 170321 | 10/1921 |
| GB | 1321396 | 2/1972 |
| GB | 1321396 | 6/1973 |
| GB | 2104030 | 3/1983 |
| GB | 2109765 | 6/1983 |
| GB | 2109765 A * | 6/1983 |
| GB | A 2129754 | 5/1984 |
| JP | 07033241 | 2/1995 |
| JP | 07157058 | 6/1995 |
| NL | 7101881 | 2/1971 |
| WO | WO 2007/067049 | 6/2007 |
| WO | WO 2007064659 | 6/2007 |
| WO | WO 2008136673 | 11/2008 |
| WO | WO 2009005349 | 1/2009 |
| WO | WO 2010/130716 | 11/2010 |

OTHER PUBLICATIONS

AmbaFlex: "SpiralVeyor SVX-DL" Sep. 26, 2008, XP002570630 Retrieved from the Internet: URL:http://www.ambaflex.com/assets/www.AmbaFlex.com/downloadables/SpiralVeyor/leaflet_SVX-DL_en.pdf.

European Search Report and Written Opinion of the European Patent Office Patent Office in foreign application No. PCT/ EP2010/056424 filed May 11, 2010. Delete the Following paragraph if no English equivalents of foreign documents are submitted.

Restriction Requirement for U.S. Appl. No. 12/520,794, filed Aug. 21, 2009, mailed Dec. 16, 2011, pp. 1-5.

Office Action for U.S. Appl. No. 12/520,794, filed Aug. 21, 2009, mailed Mar. 13, 2012, pp. 1-8.

European Patent Office in counterpart foreign application No. PCT/EP2009/063518 filed Oct. 15, 2009.

Official Search Report of the European Patent Office Patent Office in application No. PCT/NL2007/050695 filed Dec. 21, 2007.

Written opinion of the European Patent Office Patent Office in application No. PCT/NL2007/050695 filed Dec. 21, 2007.

Official Search Report of the European Patent Office Patent Office in application No. PCT/NL2006/000628 filed Dec. 8, 2006.

Written opinion of the European Patent Office Patent Office in application No. PCT/NL2006/000628 filed Dec. 8, 2006.

International Search Report of the European Patent Office Patent Office in application No. PCT/NL2008/050273 filed May 7, 2008.

Written Opinion of the European Patent Office Patent Office in application No. PCT/NL2008/050273 filed May 7, 2008.

Office Action for U.S. Appl. No. 13/320,093, filed Jan. 5, 2012.

* cited by examiner

BUFFER CONVEYOR HAVING PARALLEL TRACKS

CROSS-REFERENCE TO RELATED APPLICATION

This application is a Section 371 National Stage Application of International Application PCT/EP2009/063518 filed Oct. 15, 2009 and published as WO/2010/043692 in English.

BACKGROUND

The discussion below is merely provided for general background information and is not intended to be used as an aid in determining the scope of the claimed subject matter.

An aspect of the present invention relates to a conveyor for buffering products, comprising at least first and second drivable curved conveyor parts, spaced from each other in horizontal direction, at least the first conveyor part having at least an inner track and an outer track, wherein the outer track is adjacent to the inner track and disposed at the outside bend side of the inner track, the second conveyor part having at least a second conveyor part track, wherein one end of the outer track of the first conveyor part is coupled to one end of the second conveyor part track and wherein an other end of the second conveyor part track is coupled to one end of the inner track of the first conveyor part.

Such a conveyor is known from NL 7101881. In the known conveyor the products are supplied at an upper level of the conveyor and are circulated at that level several times along curved conveyor parts and straight conveyor parts disposed between the curved conveyor parts. The products are first transported along the outer track and subsequently along the inner track. After several circulations at the upper conveyor level the products are transported to a lower level and the products move from an inner track to an outer track at the lower level.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One aspect of a conveyor includes first and second conveyor parts that are at least partly helically-shaped.

This means that at least two helically-shaped conveyor parts having longitudinal center lines which are spaced from each other are coupled to each other such that products may follow at least the inner and outer tracks of the first conveyor part and the second conveyor part track. For example, products are supplied to one end of the outer track of the first conveyor part. They will be transported along the helical path to the other end of the outer track of the first conveyor part. From the other end of the outer track of the first conveyor part the products are transported to one end of the second conveyor part track, and subsequently to the other end of the second conveyor part track. Then, the products move to one end of the inner track of the first conveyor part and subsequently follow the helical path of the inner track of the first conveyor part to an other end thereof. From there the products may leave the conveyor. Because of the helical shape of the first and second conveyor parts the products will be transported upwardly and/or downwardly between the ends of the inner and outer tracks of the first conveyor parts and between the ends of the second conveyor part track. Compared to the conveyor of the prior art as described above the ratio between path length and space occupied by the conveyor has increased. A further advantage of the conveyor is that it provides the opportunity to apply a minimum number of transfer locations and changes in inclination rate along the conveyor path. This avoids the phenomenon of changes in product orientation with respect to the inner and outer tracks during transport of the products by the conveyor, to which phenomenon the prior art conveyor is sensitive, especially in case of less stable products.

The second conveyor part may also comprise an inner track, wherein the second conveyor part track forms an outer track which is disposed at the outside bend side of the inner track of the second conveyor, and wherein an other end of the inner track of the first conveyor part is coupled to one end of the inner track of the second conveyor part. This increases the capacity of the conveyor. In this case the products may leave at an other end of the inner track of the second conveyor part.

At least one of the first and second conveyor parts may be driven by a single driving means following the helical path. In practice the driving means may comprise a chain, for example, to which slats for carrying products are fixed. In this case the parallel tracks of the first conveyor part, for example, are not driven separately but have a common driving device.

In an alternative embodiment the other end of the second conveyor part track may be coupled to the one end of the inner track of the first conveyor part by a displacement mechanism disposed between the other end of the second conveyor part track and the one end of the inner track of the first conveyor part. In that case the inner track of the first conveyor part and the second conveyor part track may be out of alignment at their ends.

In a particular embodiment the other end of the second conveyor part track and the one end of the inner track of the first conveyor part are coupled to each other via a tangential track extending substantially tangentially with respect to the helical part of said second conveyor part track and the helical part of said inner track of the first conveyor part. This results in a compact conveyor configuration. Besides, in this case the one end of the inner track of the first conveyor part is coupled to the other end of the second conveyor part track such that the products are not submitted to a sudden movement in lateral direction. The conveyor may be configured such that at least a portion of the inner track of the first conveyor part at the one end thereof is substantially aligned with a portion of the second conveyor part track at the other end thereof so as to minimize sudden lateral displacements of products along the conveying path of the conveyor.

In a similar way the one end of the outer track of the first conveyor part and said one end of the second conveyor part track may be coupled to each other via a tangential track which extends substantially tangentially with respect to the helical part of the outer track of the first conveyor part and the helical part of the second conveyor part track.

In one embodiment, at least the inner and outer tracks of the first conveyor part are provided with a common conveyor belt for carrying and transporting products and the inner and outer tracks are provided with tracking device for keeping products on the inner and outer tracks during transport. The inner and outer tracks may be separated by a guide for keeping products on track. A common conveyor belt means that the width of the conveyor belt is larger than the width of the individual inner and outer tracks. Applying a common conveyor belt means a reduction of costs, whereas the products are easily maintained on track by the tracking device. This appears to be very effective in case of transporting and buffering small and less stable products. Besides, the inner and outer tracks can be disposed closely to each other resulting in a compact conveyor. Nevertheless, in certain cases separate parallel conveyor belts may be applied, as well. In practice the guide may comprise upwardly oriented plate-like elements, but alternative guides are conceivable. Alternatively, the conveyor belt includes a supporting surface for supporting products which is provided with friction for keeping products on track. It is further possible that the entire conveyor is provided with a single conveyor belt, which means that the conveyor belt follows the helical paths of the first and second conveyor parts. The single conveyor belt may successively follow the outer track of the first conveyor part, the second conveyor part track and the inner track of the first conveyor part.

An aspect of the invention is also related to a conveyor for buffering products, comprising a drivable helical input conveyor including an input conveyor input and a plurality of input conveyor outputs, a drivable helical output conveyor including a plurality of output conveyor inputs and an output conveyor output, and a plurality of accumulating conveyors, which is adapted such that under operating conditions a product can be transported from the input conveyor input via one of the input conveyor outputs to a selected accumulating conveyor during a loading cycle, and from a selected accumulating conveyor via one of the output conveyor inputs to the output conveyor output during a discharging cycle. The advantage of this conveyor is that it is relatively compact. During the loading cycle and/or the discharging cycle the helical input conveyor and/or the helical output conveyor can be operated continuously. In case of vertically oriented helical input and output conveyors each of the accumulating conveyors can be filled by products which are continuously transported upwardly by the helical input conveyor. At a desired moment products stored on the accumulating conveyors can be transported continuously downwardly by the helical output conveyor. An advantage of the application of helically shaped conveyors is that sudden changes in transport direction are avoided. Under operating conditions the desired accumulating conveyor to be filled by products from the helical input conveyor or emptied by transporting products to the helical output conveyor can be selected by means of displacing members driven by an operating mechanism, for example. It is noted that the conveyor is typically suitable for luggage handling at airports in order to store luggage for a relatively short period of time.

At least one of the accumulating conveyors may be coupled tangentially to the helical input conveyor and/or the helical output conveyor as seen in a direction along a central axis of the helical input conveyor and/or the helical output conveyor, respectively. Due to this configuration the transport directions of products which are transferred between the accumulating conveyors and the helical input and output conveyors only gradually change.

In a specific embodiment at least two accumulating conveyors are each functionally coupled to one of the input conveyor outputs and/or one of the output conveyor inputs at a mutual distance along the helical path of the helical input conveyor and/or the helical output conveyor, respectively, which is substantially equal or smaller than one turn of the winding of said helical input and/or output conveyors. This improves efficient use of space between the helical input and output conveyors.

The accumulating conveyors may at least partly extend substantially parallel to each other as seen in a direction along a central axis of the helical input conveyor and/or the helical output conveyor and wherein the total width of the accumulating conveyors is substantially equal or smaller than the outer diameter of the helical input conveyor and/or the helical output conveyor. This creates an efficient use of space within a virtual block shaped room. In practice the outer diameter of a helical conveyor may be defined as the diameter of a cross-sectional are of the helical part of the helical conveyor.

In an alternative embodiment the helical input conveyor and the helical output conveyor are integrated in a single helical conveyor such that during a loading cycle the conveying directions of the single helical conveyor and the accumulating conveyors are opposite to the conveying directions thereof during the discharging cycle. In this case the single helical conveyor can be operated as the helical input conveyor which transports products from the input conveyor input via one of the input conveyor outputs to the corresponding accumulating conveyor during a loading cycle, whereas the conveying directions of the accumulating conveyors and the single helical conveyor are reversed during a discharging cycle such that a product on one of the accumulating conveyors can be transported via a corresponding output conveyor input to the output conveyor output. Thus, in the single helical conveyor the input conveyor input changes to the output conveyor output, and the input conveyor outputs change to the output conveyor inputs, when switching from the loading cycle to the discharging cycle. It is noted, that in this embodiment the products are stored and discharged by the last-in-first-out principle, whereas in case of separate helical input and output conveyors the products are stored and discharged by the first-in-first-out principle.

An aspect of the invention is also related to a method of controlling a conveyor as described hereinbefore, wherein the conveyor is provided with product position sensors so as to monitor the position of products within the conveyor, wherein a control system controls displacing members for transferring products from and to the accumulating conveyors and for driving motors of the helical input conveyor, the accumulating conveyors and the helical output conveyor.

An aspect of the invention is also related to a conveyor for buffering products, comprising a first helical conveyor including a first conveyor input and a first conveyor output, and a second helical conveyor including a second conveyor input and a second conveyor output, wherein the first conveyor output is coupled to the second conveyor input and the second conveyor output is coupled to the first conveyor input, wherein the conveyor is provided with a loading and a discharging station for loading and discharging products to and from the conveyor, respectively. In this case products are circulated along both helical conveyors. For, example, at a certain moment, when a product which is stored in the conveyor, is required the product is discharged at the discharging station upon passing the discharging station. The first conveyor input and first conveyor output as well as the second conveyor input and second conveyor output may be located at opposite ends of the helical conveyors, respectively, but this is not necessary.

In one embodiment, the first helical conveyor is drivable in upward direction and the second helical conveyor is drivable in downward direction, because this provides the opportunity to locate both helical conveyors close to each other, since the first conveyor output can be coupled directly to the second conveyor input at the same height level and the second conveyor output can be directly coupled to the first conveyor input at the same height.

The second conveyor output may be coupled to the first conveyor input via at least a further helical conveyor in order to create a higher buffer capacity of the conveyor. Thus, in this case the second conveyor output and the first conveyor input are not directly coupled to each other.

In a particular embodiment of the conveyor central axes of the helical conveyors extend substantially parallel.

The first helical conveyor may be provided with a further first conveyor input and the second helical conveyor with a further second conveyor output, wherein the further first conveyor input is coupled to the further second conveyor output. This provides the opportunity to create a short circuit such that the circulation time of the products through the conveyor is variable.

The helical conveyors may be driven such that the products on the helical conveyors have substantially the same speed. Alternatively, the conveyor may be provided with a single conveyor belt following the helical tracks of the helical conveyors, wherein an upwardly directly supporting surface of the conveyor belt stays upwardly directed along the helical paths. As a consequence, this provides stable conditions for transporting the products because of lack of transfer barriers, whereas a shorter belt length can be used instead of using separate conveyor belts in each helical conveyor. For example, no reverse rollers for reversing the conveyor belt over a non-product-supporting path back to a starting point are necessary.

BRIEF DESCRIPTION OF THE DRAWINGS

Aspects of the invention will hereafter be elucidated with reference to the very schematic drawings showing an embodiment of the invention by way of example.

DETAILED DESCRIPTION OF THE
ILLUSTRATIVE EMBODIMENTS

Figure 1:
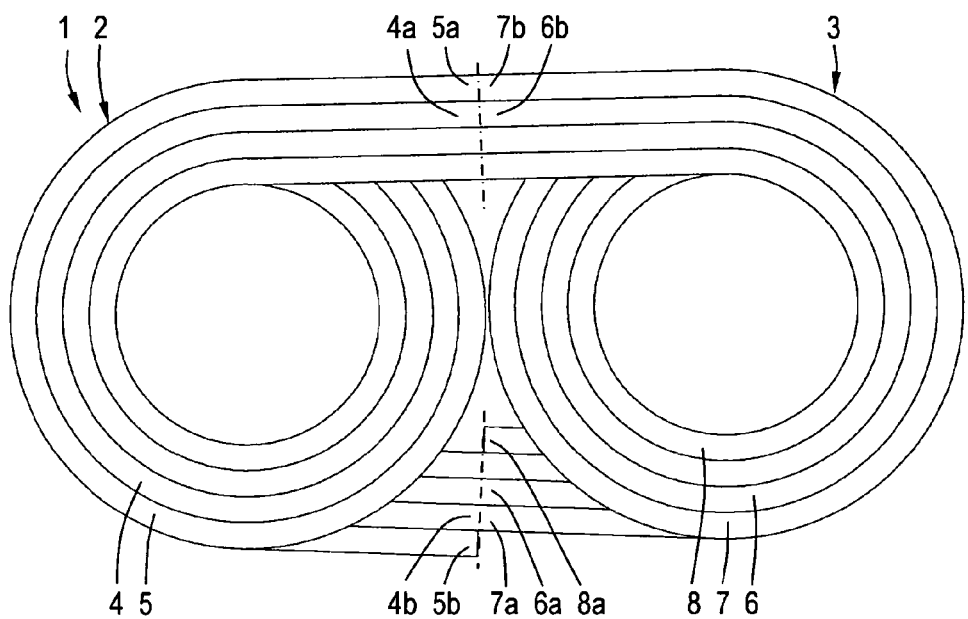
FIG. 1 is a plan view of an embodiment of a conveyor.

FIG. 1 shows an embodiment of a conveyor 1 for buffering products. The conveyor comprises a helically-shaped first conveyor part 2 and a helically-shaped second conveyor part 3. The first and second conveyor parts 2, 3 have longitudinal center lines which are directed upwardly and extend substantially parallel to each other.

The first and second conveyor parts 2, 3 are provided with a plurality of parallel tracks. For reasons of clarity the conveyor 1 of FIG. 1 is described by reference to only two parallel tracks of each conveyor part 2, 3. The first conveyor part 2 includes an inner track 4 and an outer track 5. The outer track 5 is adjacent to the inner track 4 and disposed at the outside bend side of the inner track 4. Thus, the outer track 5 at least partly surrounds the inner track 4 as seen in a direction along the longitudinal center line 5 of the first and second conveyor parts 2, 3. In this embodiment the helically-shaped first and second conveyor parts 2, 3 have a circular cross section and have similar dimensions, but alternative configurations are conceivable.

In the embodiment as shown in FIG. 1 the second conveyor part 3 includes an inner track 6 and an outer track 7. Similar to the first conveyor part 2 the outer track 7 is adjacent to the inner track 6 and disposed at the outside bend side of the inner track 6. It is also conceivable that the second conveyor part 3 only has a single track 7, which may be called a second conveyor part track.

The outer track 5 of the first conveyor part 2 has an outlet end 5a where products leave the outer track 5 and an inlet end 5b where products are received by the outer track 5. In the same way the inner track 4 of the first conveyor part 2 has an outlet end 4a where products leave the inner track 4 and an inlet end 4b where products are received by the inner track 4. It is noted that the words inlet and outlet do not necessarily mean that there must be a transfer between the tracks 4, 5 of the first conveyor part 3 and the tracks 6, 7 of the second conveyor part 3, such as a transfer including a lateral slot between the mentioned tracks.

The outer track 7 of the second conveyor part 3 has an outlet end 7a where products leave the outer track 7 and an inlet end 7b where products are received by the outer track 7. In the same way the inner track 6 of the second conveyor part 2 has an outlet end 6a where products leave the inner track 6 and an inlet end 6b where products are received by the inner track 6. As already mentioned hereinbefore, it is noted that the words inlet and outlet do not necessarily mean that there must be a transfer between the tracks 4, 5 of the first conveyor part 3 and the tracks 6, 7 of the second conveyor part 3.

FIG. 1 shows that the outlet end 5a of the outer track 5 of the first conveyor part 1 is coupled to the inlet end 7b of the outer track 7 of the second conveyor part track 3. Furthermore, the outlet end 7a of the outer track 7 of the second conveyor part 3 is coupled to the inlet end 4b of the inner track 4 of the first conveyor part 2.

The outlet end 4a of the inner track 4 of the first conveyor part 2 is coupled to the inlet end 6b of the inner track 6 of the second conveyor part 3, and so on.

The embodiment of the conveyor 1 is configured such that a portion of the first conveyor part 2 at the outlet ends 4a and 5a thereof are aligned with a portion of the second conveyor part 3 at the inlet ends 6b and 7b thereof. In fact, these portions form tangential track portions extending tangentially with respect to the helical parts of the inner tracks 4, 6 and the helical parts of the outer tracks 5, 7 of the first and second conveyor parts 2, 3.

Similarly, a portion of the inner track 4 of the first conveyor part 2 at the inlet end 4b is aligned with a portion of the outer track 7 of the second conveyor part 3 at the outlet end 7a thereof. These portions form a tangential track extending tangentially with respect to the helical part of the outer track 7 of the second conveyor part 3 and the helical part of the inner track 4 of the first conveyor part 2.

Several driving means or supporting means configurations of the conveyor are possible. In practice a relatively wide single and/or common conveyor belt for the entire conveyor 1 may be applied, for example slats fixed to a chain that follows the helical paths of the first and second conveyor parts 2, 3. In the case of a common conveyor belt the inner and outer tracks 4, 5 and/or 6, 7 comprise the same conveyor belt, but they are separated by guiding means, for example, for keeping the products on track. The guiding means are, for example upwardly extending plate-like elements. Preferably, the guiding means are fixed to a frame of the conveyor 1.

The path that products follow in the embodiment of the conveyor 1 as shown in FIG. 1 is as follows. Products are received by the conveyor 1 at the inlet end 5b of the outer track 5 of the first conveyor part 2, which inlet end 5b is disposed at a low height level. The products are transported along the helical path of the first conveyor part 2 upwardly and arrive at the outlet end 5a of the outer track 5. From there the products are moved to the inlet end 7b of the outer track 7 of the second conveyor part 3 and follow the helical path of the second conveyor part 3 downwardly. Upon arrival at the outlet end 7a of the outer track 7 of the second conveyor part 3 the products continue their way to the inlet end 4b of the inner track 4 of the first conveyor part 2. After several circulations through the conveyor 1 the products arrive at an outlet end 8a of a most inner track 8 of the second conveyor part 3. It is noted that the product stream may be in opposite direction, i.e. the products are received by the conveyor 1 at the outlet end 8a of the most inner track 8 of the second conveyor part 3 and leave the conveyor 1 at the inlet end 5b of the outer track 5 of the first conveyor part 2.

Figure 2:
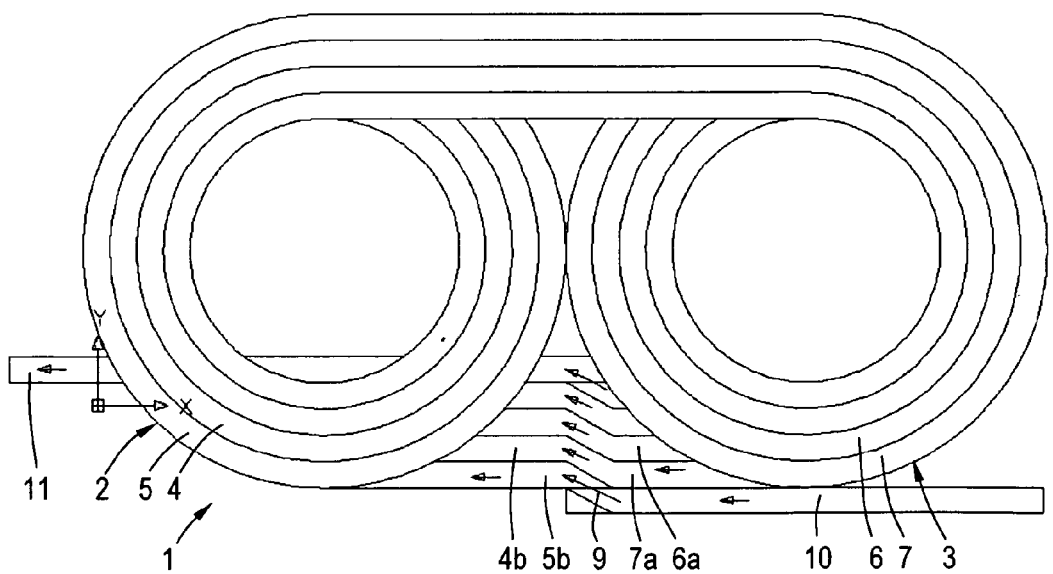
FIG. 2 is a similar view as FIG. 1 of an alternative embodiment of the conveyor.

FIG. 2 shows an alternative embodiment of the conveyor 1. The first and second conveyor parts 2, 3 are similar to that of the embodiment of FIG. 1, but the transfers between the outlet ends 6a, 7a of the inner and outer tracks 6, 7 of the second conveyor part 3 and the inlet ends 4b, 5b of the inner and outer track 4, 5 of the first conveyor part 2 have a different configuration. The outlet end 7a of the outer track 7 of the second conveyor part 3 is coupled to the inlet end 4b of the inner track 4 of the first conveyor part 2 by a displacement mechanism 9. For example, the displacement mechanism 9 may be disposed between the outlet end 7a of the outer track 7 of the second conveyor part 3 and the inlet end 4b of the inner track 4 of the first conveyor part 2 so as to move the products from the outer track 7 of the second conveyor part 3 to the inner track 4 of the first conveyor part 2. The tracks 6a and 4b, and 7a and 5b may comprise two parallel conveyor belts or a common conveyor belt with separated tracks, whereas the displacement mechanism 9 may be a single diverter. In case of a common conveyor belt in the embodiment of FIG. 2 the width of the belt comprises at least the widths of four tracks, whereas additional separate conveyor belts 10 and 11 serve as input and output tracks, respectively. The common conveyor belt may also be a single belt which follows the helical paths of both the first and second conveyor parts 2, 3.

It is noted that the outlet ends 4a, 5a of the inner and outer tracks 4, 5 respectively, and the corresponding inlet ends 6b, 7b of the inner and outer tracks 6, 7, respectively, are not indicated explicitly in FIG. 2. In FIG. 1 the inlets and outlets are indicated explicitly, but is does not mean that there must be a separation of two conveyor belts at those locations. The outlet ends 4a, 5a and the inlet ends 6b, 7b only indicate end portions of the curved or helically-shaped first and second conveyor parts 2, 3 of the conveyor 1. Therefore, in case of a common conveyor belt in the embodiment of FIG. 2 the conveyor belt may be a single conveyor belt following the helical paths of both the first and second conveyor parts 2, 3.

Figure 3:
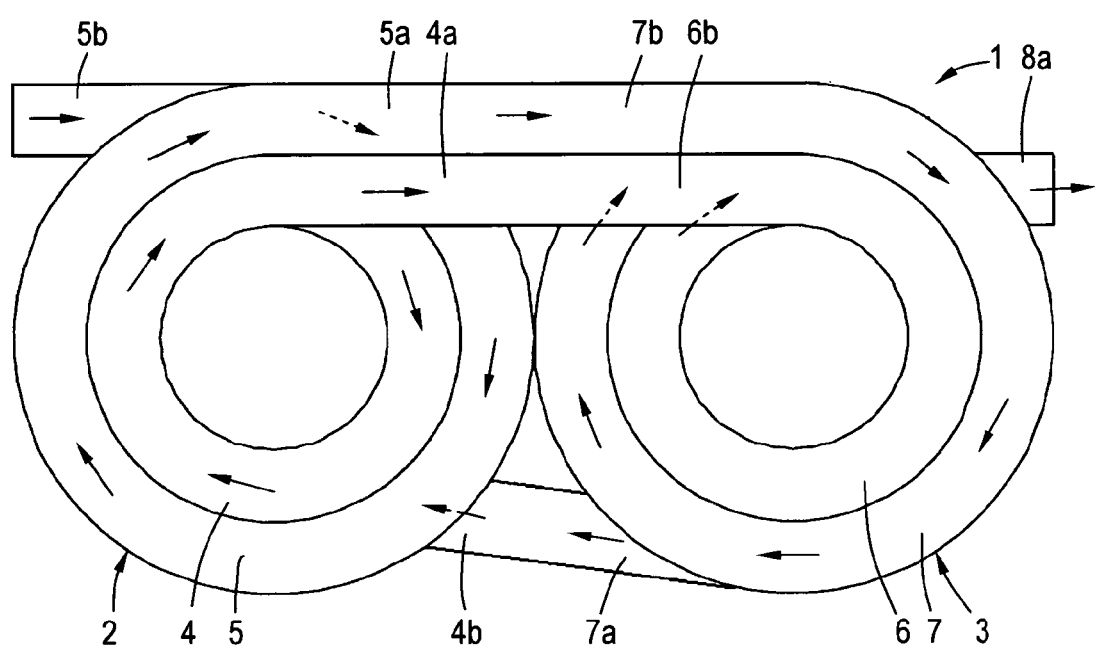
FIG. 3 is a similar view as FIG. 1 of another alternative embodiment of the conveyor.

The outlets 4a, 5a and inlets 6b, 7b are illustrated, for example, in FIG. 3 which shows another alternative embodiment of the conveyor 1. The first and second conveyor parts 2, 3 each have only one inner track 4, 6, respectively, and one outer track 5, 7, respectively. The conveying direction of the products entering the conveyor 1 at the inlet end 5b of the outer track 5 of the first conveyor part 2 and leaving the conveyor 1 at the outlet end 8a of the inner track 6 of the second conveyor part 3 is similar. The portions of the tracks at the inlet end 5b and the outlet end 8a are substantially parallel. In this embodiment the conveyor belt is a single continuous belt which extends from the inlet end 5b to the outlet end 8a without interruptions or transfer locations. The single conveyor belt successively follows the outer track 5 of the first conveyor part 2 upwardly, the outer track 7 of the second conveyor part 3 downwardly, the inner track 4 of the first conveyor part 2 upwardly, and the inner track 6 of the second conveyor part 3 downwardly. It is noted, that in this case the inner and outer tracks 4, 5 of the first conveyor part 2, and the inner and outer tracks 6, 7 of the second conveyor part 3 are not made of a common conveyor belt.

It is noted that it is possible, for example, that the first conveyor part comprises an inner and outer track whereas the second conveyor only comprises a single track.

Figure 4:
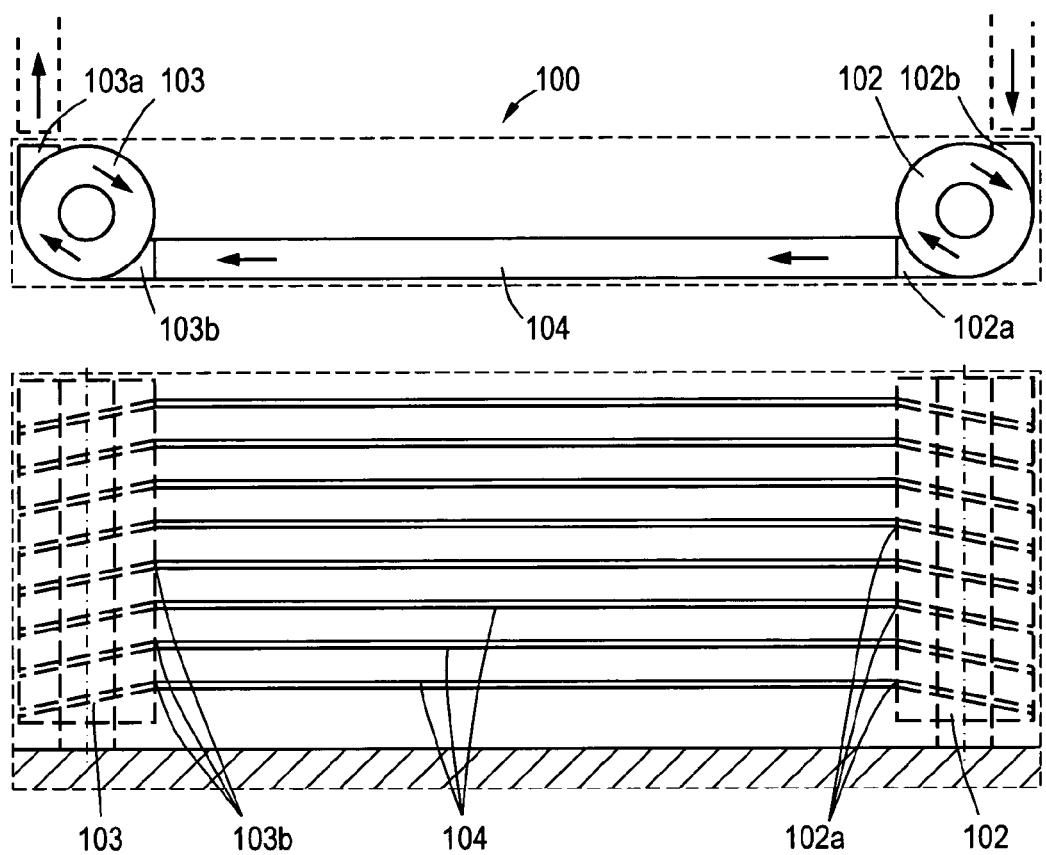
FIG. 4 is a very schematic top view and side view of a further alternative embodiment of a conveyor.

FIG. 4 shows an alternative embodiment of a conveyor 100 according to the invention. This embodiment comprises a drivable helical input conveyor 102, which has an input conveyor input 102b for receiving products and a plurality of input conveyor outputs 102a for discharging products from the helical input conveyor 102. The conveyor 100 further comprises a drivable helical output conveyor 103, which has a plurality of output conveyor inputs 103b for receiving products and an output conveyor output 103a for discharging products from the helical output conveyor 103. It is conceivable that the conveyor 100 also comprises a plurality of input conveyor inputs 102b and/or output conveyor outputs 103a. The conveyor 100 according to FIG. 4 includes a plurality of drivable accumulating conveyors 104 for storing products supplied by the helical input conveyor 102 and transporting stored products to the helical output conveyor 103. The number of accumulating conveyors 104 equals the number of input conveyor outputs 102a and output conveyor inputs 103b. The accumulating conveyors are coupled tangentially to the helical input conveyor 102 and the helical output conveyor 103 as seen from above.

In this case the accumulating conveyors 104 are connected to the helical input and output conveyors 102, 103 at about each turn of the helical windings thereof and extend substantial parallel to each other in vertical direction, but alternative configurations and connecting locations to the conveyors 102, 103 are conceivable. Furthermore, the helical conveyors 102, 103 are vertically oriented and have central axes which extend substantially parallel to each other. The embodiment of FIG. 4 has eight accumulating conveyors 104, but a higher or lower number is conceivable.

The conveyor 100 is adapted such that under operation conditions a product can be transported from the input conveyor input 102b via a selected one of the input conveyor outputs 102a to the corresponding accumulating conveyor 104 during a loading cycle. During a discharging cycle a product on a selected one of the selected accumulating conveyors 104 can be transported via a corresponding output conveyor input 103b to the output conveyor output 103a. For example, products are transported upwardly by the helical input conveyor 102 to a selected accumulating conveyor 104 and stored there for a certain period of time, whereas at a desired moment the products are transported from the selected accumulating conveyor 104 to the helical output conveyor 103 and downwardly by the helical output conveyor 103. In this embodiment the products follow a single direction through the conveyor 100, which means that the helical input conveyor 102, the helical output conveyor 103 and the accumulating conveyors 104 are each driven in a single transport direction in practice. Preferably, all of these conveyors 102, 103, 104 are driven independently from each other.

The conveyor 100 is also provided with displacing members (not shown) in order to transfer products from the helical input conveyor 102 to an accumulating conveyor 104 and from any one of the accumulating conveyors 104 to the helical output conveyor 103.

Figure 5:
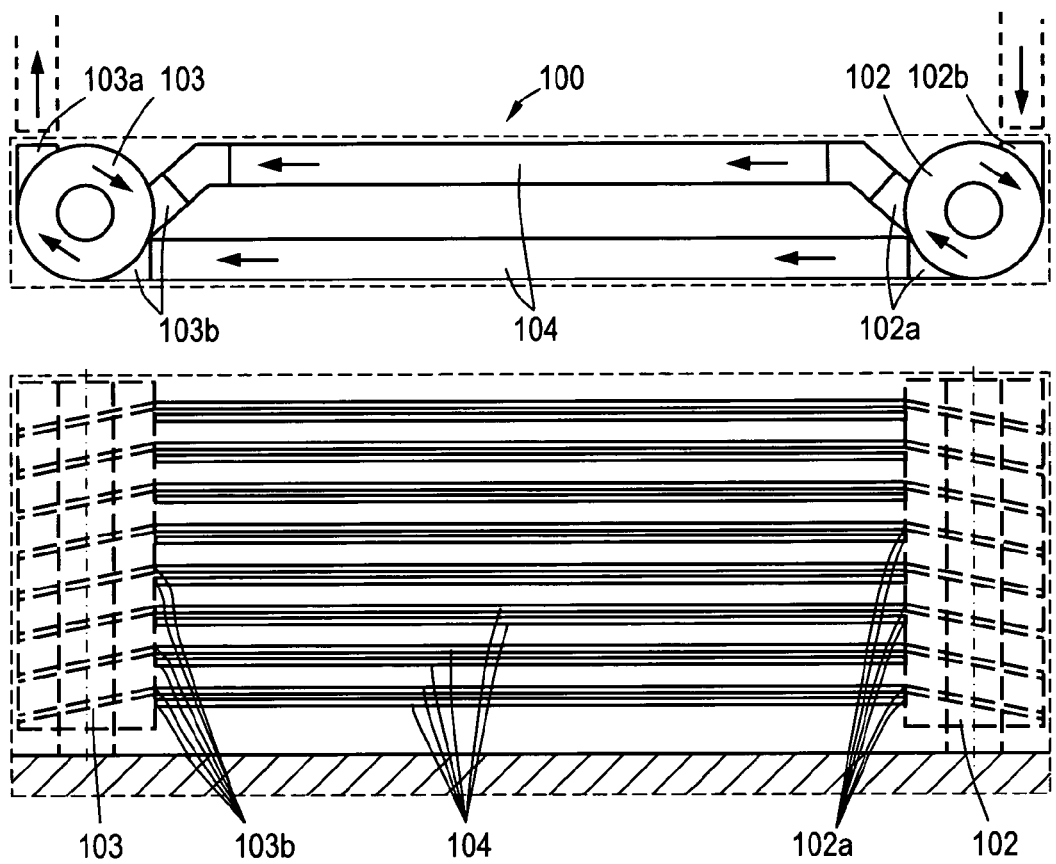
FIG. 5 is a similar view as FIG. 4 of another alternative embodiment of the conveyor.

FIG. 5 shows an alternative embodiment. In this case two successive accumulating conveyors 104 are connected to the input and output conveyors 102, 103 at a mutual distance which is smaller than a single turn of the helical windings thereof, as measured along the helical paths of the conveyors 102, 103. Each pair of successive accumulating conveyors 104 partly extend substantial parallel to each other as seen from above. The width of the accumulating conveyors 104 is substantially equal or smaller than the outer diameter of the helical input and output conveyors 102, 103. It is possible that more than two successive accumulation conveyors 104 are connected to the input and output conveyors 102, 103 at a mutual distance which is smaller than a single turn of the helical windings thereof.

Figure 6:
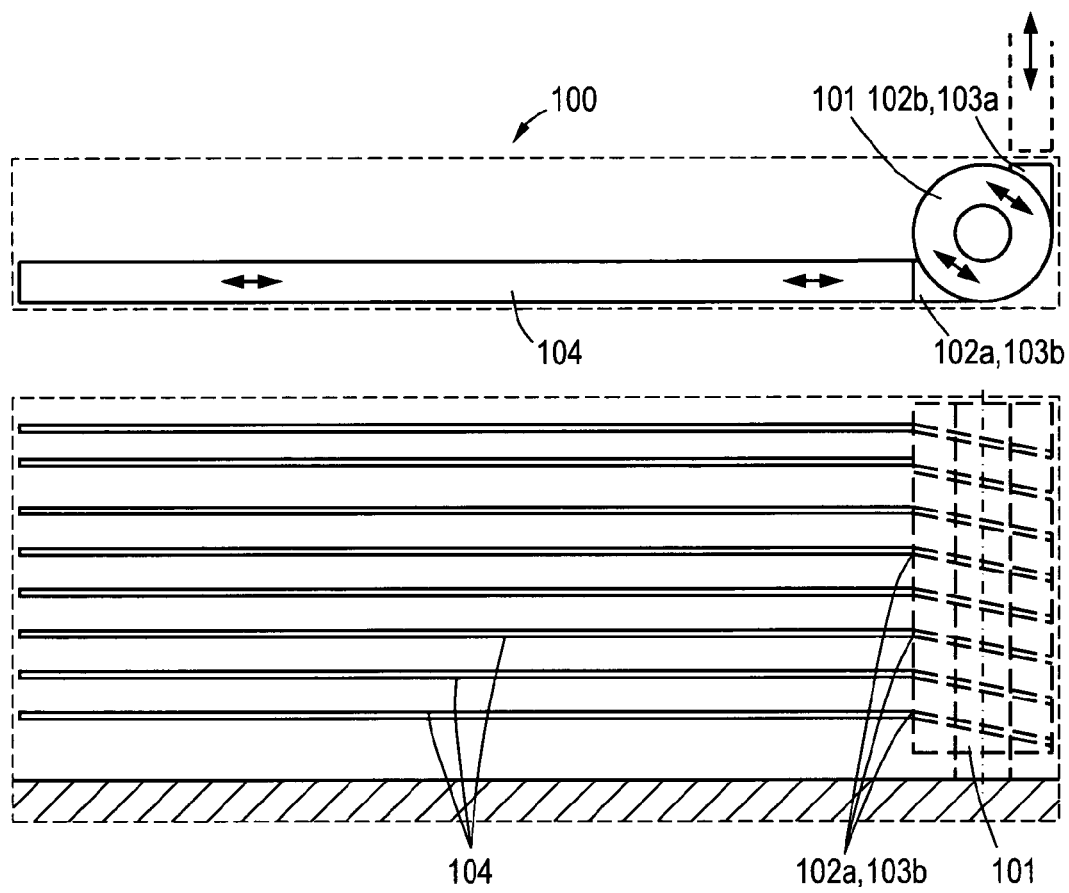
FIG. 6 is a similar view as FIG. 4 of another alternative embodiment of the conveyor.

In FIG. 6 a further alternative embodiment is shown. This embodiment of the conveyor 100 comprises a single helical conveyor 101 which is formed by an integration of the helical input conveyor 102 and the helical output conveyor 103 of the embodiments as discussed in relation to FIGS. 4 and 5. Under operating conditions the single helical conveyor 101 is operated as the helical input conveyor 102 which transports products from the input conveyor input 102b via one of the input conveyor outputs 102a to the corresponding accumulating conveyor 104 during a loading cycle. During a discharging cycle the conveying directions of the accumulating conveyors 104 and the single helical conveyor 101 are reversed such that a product on any one of the accumulating conveyors 104 is transported via a corresponding output conveyor input 103b to the output conveyor output 103a. Thus, in the single helical conveyor 101 the input conveyor input 102b changes to the output conveyor output 103a, and the input conveyor outputs 102a change to the output conveyor inputs 103b, when switching from the loading cycle to the discharging cycle as shown by the double-headed arrows in FIG. 6.

It is noted, that the embodiments as shown in FIGS. 4-6 are suitable for sorting products. For example, a mixed batch of products is transported upwardly by the helical input conveyor 102 and sorted by product type over the different accumulating conveyors 104.

Figure 7:
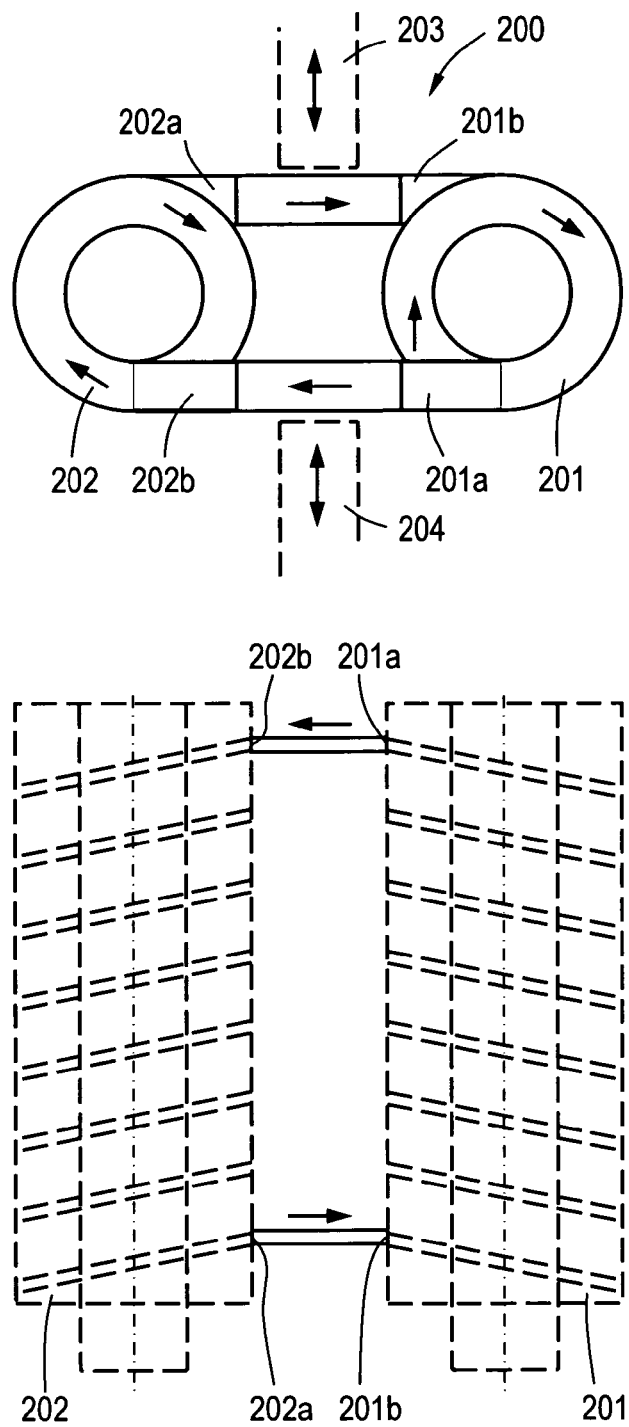
FIG. 7 is a similar view as FIG. 4 of still another alternative embodiment of the conveyor.

FIG. 7 shows an alternative embodiment of a conveyor 200 for buffering products. The conveyor 200 comprises a drivable first helical conveyor 201 which is provided with a first conveyor input 201b and a first conveyor output 201a, which are located at opposite ends of the helical path of the first helical conveyor 201. The conveyor 200 also comprises a drivable second helical conveyor 202 which is provided with a second conveyor input 202b and a second conveyor output 202a, which are located at opposite ends of the helical path of the second helical conveyor 202. The first conveyor output 201a is coupled to the second conveyor input 202b and the second conveyor output 202a is coupled to the first conveyor input 201b. This means that upon driving the first helical conveyor 201 and the second helical conveyor 202 products on these conveyors are circulated through the conveyor 200. In order to supply products to the conveyor 200 for buffering and to discharge buffered products, the conveyor 200 is provided with a loading station 203 and a discharging station 204. The conveyor 200 is also provided with displacing members (not shown) in order to transfer products from and to the helical input and output conveyors 201, 202.

In the embodiment as shown in FIG. 7 the first helical conveyor 201 is drivable in upward direction and the second helical conveyor 202 is drivable in downward direction, as indicated by arrows in FIG. 7.

Figure 8:
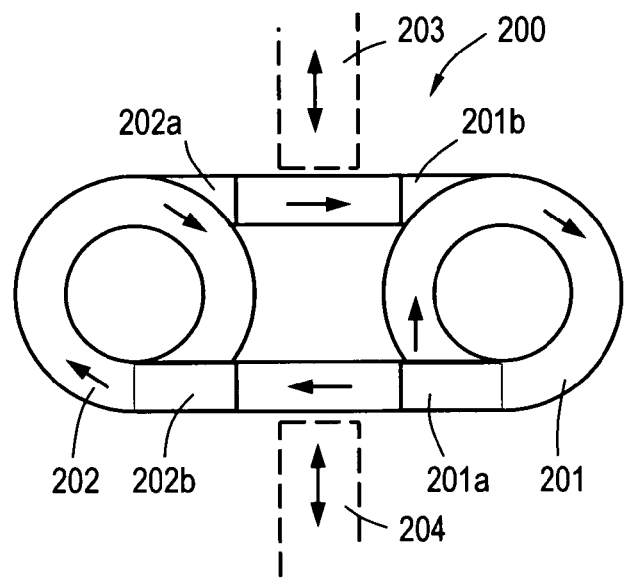
FIG. 8 is a similar view as FIG. 7 of an alternative embodiment of the conveyor.
Figure 8:
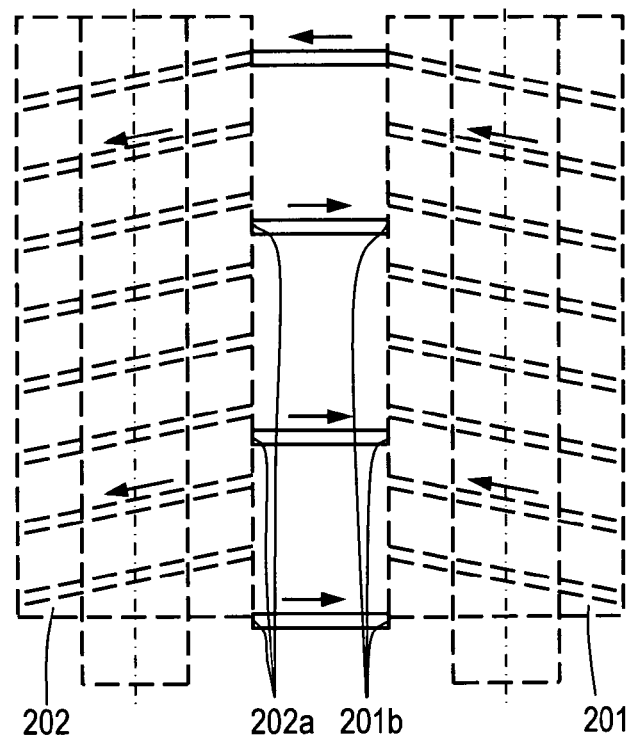

FIG. 8 shows an alternative embodiment in which more connections are provided between the first helical conveyor 201 and the second helical conveyor 202. The first helical conveyor 201 is provided with two further first conveyor inputs 201b and the second helical conveyor with two further second conveyor outputs 202a. Each of the further first conveyor inputs 201b is coupled to a corresponding further second conveyor output 202a. In this way short circuits are created such that the circulation time of the products through the conveyor 200 is variable.

Figure 9:
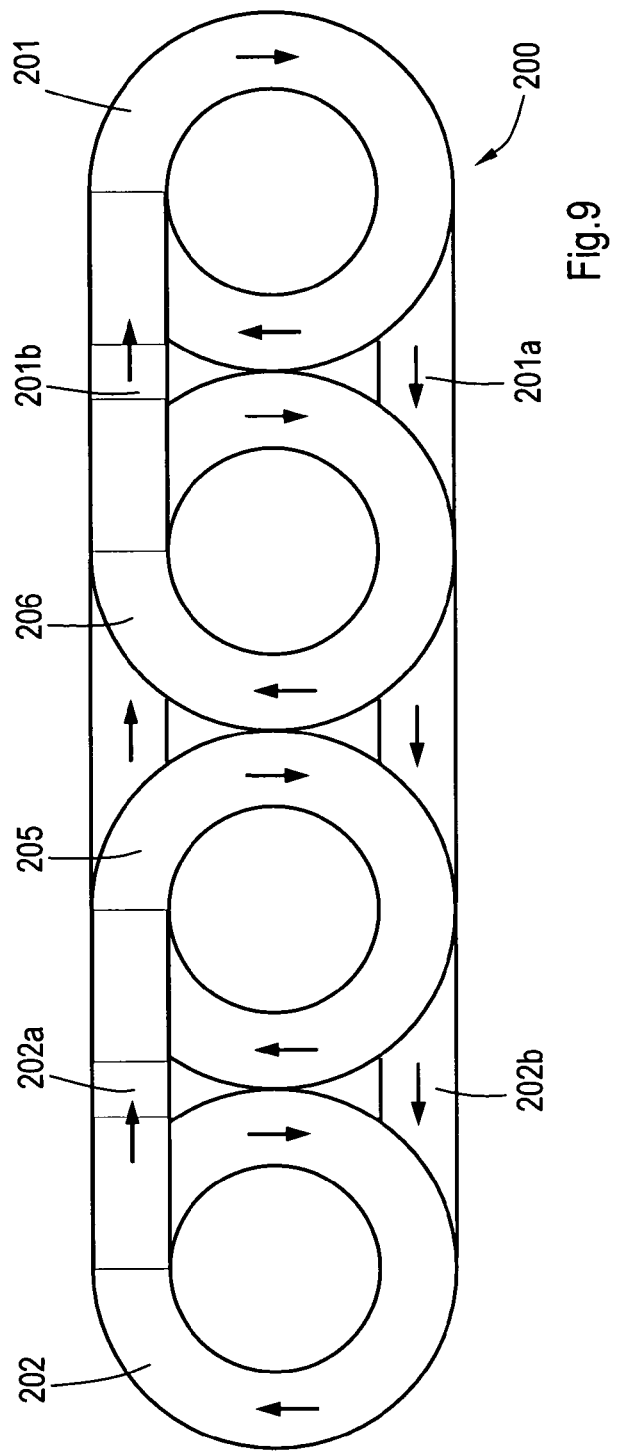
FIG. 9 is a very schematic top view of an alternative embodiment of the conveyor according to FIG. 7.

FIG. 9 shows an alternative embodiment of the conveyor according to FIG. 7. In this conveyor 200 the second conveyor output 202a is coupled to the first conveyor input 201b via two further helical conveyors 205, 206. The first conveyor output 201a is directly coupled to the second conveyor input 202b. In the configuration as shown in FIG. 9 the central axes of the four helical conveyors extend substantially parallel and are aligned. The helical conveyors 202, 205, 206, 201, as seen from the left to the right, convey products upwardly, downwardly, upwardly and downwardly, respectively. The advantage of this configuration of a buffer is a high ratio between path length and required volume of the conveyor 200. The loading station and discharging station are not illustrated in FIG. 9.

Figure 10:
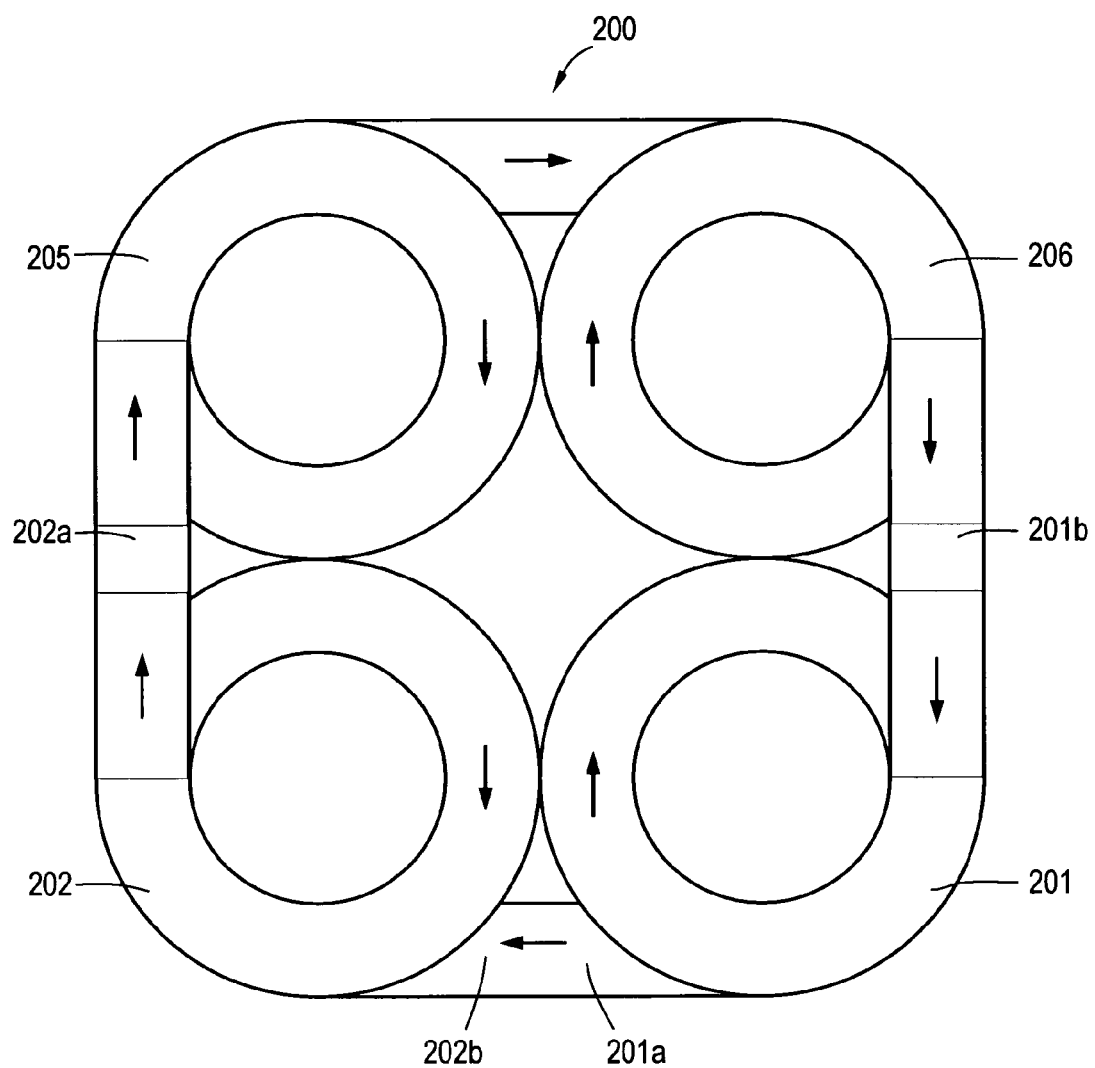
FIG. 10 is a similar view as FIG. 9 of an alternative embodiment.

FIG. 10 shows still another embodiment 200 in which the second conveyor output 202a is also coupled to the first conveyor input 201b via two further helical conveyors 205, 206, but in this case the helical conveyors 201, 202, 205 and 206 are disposed such that their central axes in a cross-section of the conveyor 200 form the corners of a virtual square. It will be clear that numerous alternative configurations are conceivable.

Figure 11:
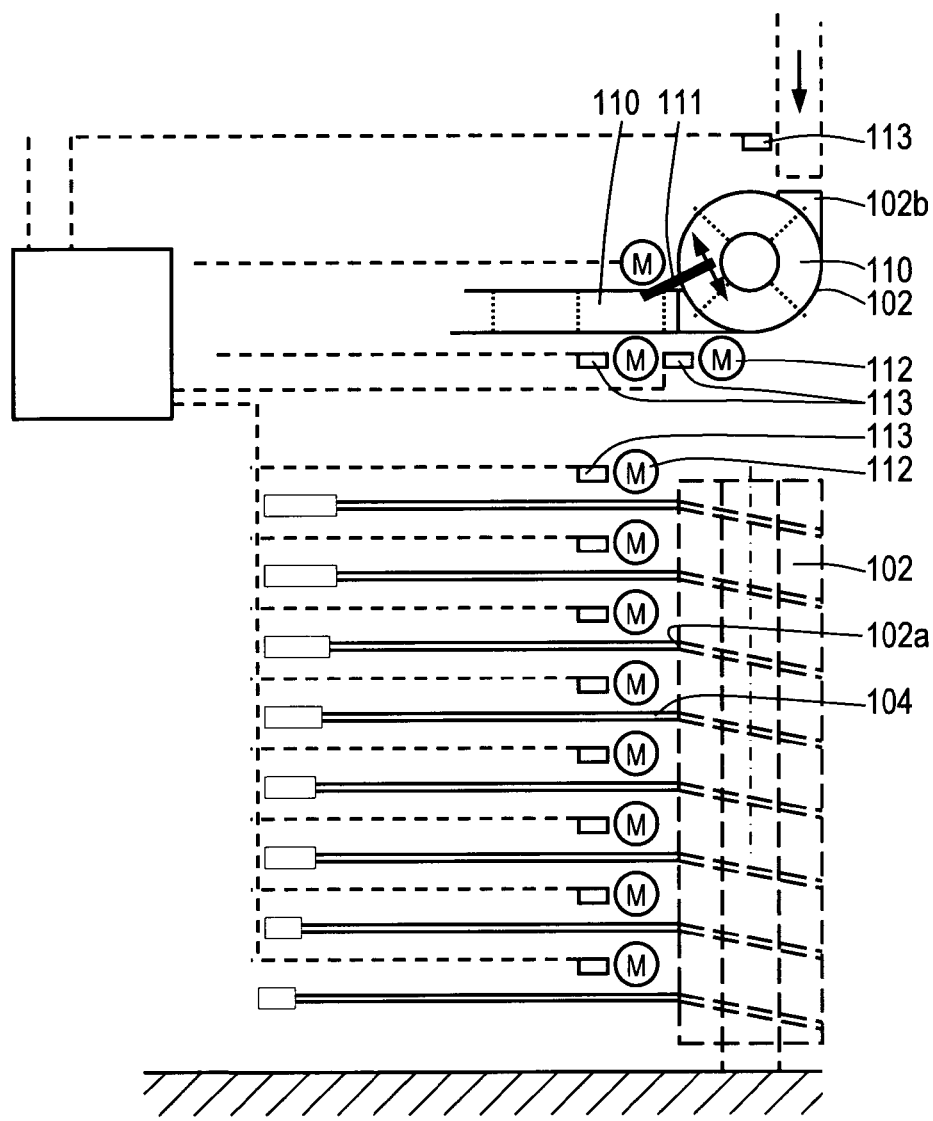
FIG. 11 is a schematic diagram of a control structure of the embodiments according to FIGS. 4-6.

FIG. 11 shows a diagram of a control structure for controlling the embodiments of a conveyor as shown in FIGS. 4-6. The products arrive at the input conveyor input 102b and are detected by a sensor 112. In the helical input conveyor 102, the accumulating conveyors 104 and the helical output conveyor 103 each product/a number of products obtains/obtain a virtual segmental portion 110 of the track, as illustrated by broken lines in the helical input conveyor 102 and the accumulating conveyors 104. The virtual segmental portions 110 may have a fixed surface, but may also be variable. A control system monitors the position of the product/products within the helical input conveyor 102, the accumulating conveyors 104 and the helical output conveyor 103, for example by means of a pulse generator mounted to the driving motor 113 of the corresponding conveyors 102, 103, 104. The control system is programmed such that the product(s) is(are) transferred to and from the desired accumulating conveyor 104, by driving the driving motors of the conveyors 102-104 at desired moments and controlling displacing members 111, see FIG. 11.

It is conceivable to provide additional detection sensors along the tracks of the conveyors 102-104 so as to exactly monitor the positions of the product(s) and possibly correct the positions for slip in the conveyor 100. Alternatively, product can be recognized by a barcode, shape, colour or weight.

It is noted that the principle of the control structure can also be used for other embodiments of conveyors as described hereinbefore and alternative conveyors.

From the foregoing, it will be clear that the invention provides a conveyor which uses the occupied space efficiently.

The invention is not limited to the embodiments shown in the drawings and described hereinbefore, which may be varied in different manners within the scope of the claims and their technical equivalents. It is conceivable to combine embodiments as described above and shown in the drawings. All embodiments as described can be provided with a control system which also monitors the positions of the products in the conveyors.

The invention claimed is:

1. A conveyor for buffering products, comprising at least first and second drivable curved conveyor parts, spaced from each other in horizontal direction, at least the first conveyor part having at least an inner track and an outer track, wherein the outer track is adjacent to the inner track and disposed at an outside bend side of the inner track, the second conveyor part having at least a second conveyor part track, wherein one end of the outer track of the first conveyor part is coupled to one end of the second conveyor part track and wherein an other end of the second conveyor part track is coupled to one end of the inner track of the first conveyor part, and wherein the first and second conveyor parts each comprise at least two loops in a helical formation about a respective first or second center axis, the first and second center axes being horizontally separated.

2. The conveyor according to claim 1, wherein the second conveyor part also comprises an inner track and wherein the second conveyor part track forms an outer track being disposed at an outside bend side of said inner track of the second conveyor part, and wherein an other end of the inner track of the first conveyor part is coupled to one end of the inner track of the second conveyor part.

3. The conveyor according to claim 1, wherein at least one of the first and second conveyor parts is driven by a single drive device following the helical path.

4. The conveyor according to claim 1, wherein said other end of the second conveyor part track is coupled to said one end of the inner track of the first conveyor part by a displacement mechanism disposed between said other end of the second conveyor part track and said one end of the inner track of the first conveyor part.

5. The conveyor according to claim 1, wherein said other end of the second conveyor part track and said one end of the inner track of the first conveyor part are coupled to each other via a tangential track extending substantially tangentially with respect to a helical part of said second conveyor part track and a helical part of said inner track of the first conveyor part.

6. The conveyor according to claim 1, wherein said one end of the outer track of the first conveyor part and said one end of the second conveyor part track are coupled to each other via a tangential track extending substantially tangentially with respect to a helical part of said outer track of the first conveyor part and the helical part of said second conveyor part track.

7. The conveyor according to claim 1, wherein at least the inner and outer tracks of the first conveyor part are provided with a common conveyor belt for carrying and transporting products, and wherein the inner and outer tracks thereof are provided with tracking device configured to keep products on the inner and outer tracks during transport.

8. The conveyor according to claim 7, wherein the tracking is formed by a guide which separates the inner and outer tracks.

9. The conveyor according to claim 8, wherein the guide comprises upwardly oriented plate-like elements.

10. The conveyor according to claim 7, wherein the tracking device is formed by a supporting surface of the conveyor belt for supporting products, which supporting surface is provided with friction for keeping products on track.

11. The conveyor according to claim 1, wherein the conveyor is provided with a single conveyor belt which follows the helical paths of the first and second conveyor parts.

12. The conveyor according to claim 11, wherein the single conveyor belt successively follows the outer track of the first conveyor part, the second conveyor part track and the inner track of the first conveyor part.

13. The conveyor according to claim 1, wherein the conveyor is configured such that at least a portion of the inner track of the first conveyor part at said one end thereof is substantially aligned with a portion of the second conveyor part track at said other end thereof.

14. A conveyor for buffering products, comprising a drivable helical input conveyor comprising at least two loops in a helical formation about an input conveyer axis, the input conveyer including an input conveyor input and a plurality of input conveyor outputs, a drivable helical output conveyor comprising at least two loops in a helical formation about an output conveyer axis, the output conveyer including a plurality of output conveyor inputs and an output conveyor output, and a plurality of accumulating conveyors, which is configured such that under operating conditions a product is transported from the input conveyor input via one of the input conveyor outputs to a selected accumulating conveyor during a loading cycle, and from a selected accumulating conveyor via one of the output conveyor inputs to the output conveyor output during a discharging cycle.

15. The conveyor according to claim 14, wherein at least one of the accumulating conveyors is coupled tangentially to the helical input conveyor and/or the helical output conveyor as seen in a direction along a central axis of the helical input conveyor and/or the helical output conveyor, respectively.

16. The conveyor according to claim 14, wherein at least two accumulating conveyors are each functionally coupled to one of the input conveyor outputs and/or one of the output conveyor inputs at a mutual distance along the helical input conveyor and/or the helical output conveyor, respectively, which is substantially equal or smaller than one turn of the winding of said helical input and/or output conveyors.

17. The conveyor according to claim 16, wherein the accumulating conveyors at least partly extend substantially parallel to each other as seen in a direction along a central axis of the helical input conveyor and/or the helical output conveyor and wherein the total width of the accumulating conveyors is substantially equal or smaller than the outer diameter of the helical input conveyor and/or the helical output conveyor.

18. The conveyor according to claim 14, wherein the helical input conveyor and the helical output conveyor are integrated in a single helical conveyor such that during a loading cycle the conveying directions of the single helical conveyor and the accumulating conveyors are opposite to the conveying directions thereof during the discharging cycle.

19. A conveyor for buffering products, comprising a first helical conveyor comprising at least two loops in a helical formation about a first axis, the first helical conveyer including a first conveyor input and a first conveyor output, and a second helical conveyor comprising at least two loops in a helical formation about a second axis horizontally displaced from the first axis, the output conveyer including a second conveyor input and a second conveyor output, wherein the first conveyor output is coupled to the second conveyor input and the second conveyor output is coupled to the first conveyor input, wherein the conveyor is provided with a loading and a discharging station for loading and discharging products to and from the conveyor, respectively.

20. The conveyor according to claim 19, wherein the first helical conveyor is drivable in upward direction and the second helical conveyor is drivable in downward direction.

21. The conveyor according to claim 19, wherein the second conveyor output is coupled to the first conveyor input via at least a further helical conveyor.

22. The conveyor according to claim 19, wherein central axes of the helical conveyors extend substantially parallel.

23. The conveyor according to claim 19, wherein the first helical conveyor is provided with a further first conveyor input and the second helical conveyor with a further second conveyor output, and wherein the further first conveyor input is coupled to the further second conveyor output.

24. The conveyor according to claim 19, wherein the helical conveyors are driven such that the products on said conveyors have substantially the same speed.

25. The conveyor according to claim 19, wherein the conveyor is provided with a single conveyor belt following the helical tracks of said conveyors, wherein an upwardly directly supporting surface of the conveyor belt stays upwardly directed along the helical paths.

26. The conveyer according to claim 14, and further comprising: product position sensors arranged so as to monitor the position of products within the conveyor; displacing members configured to transfer products from and to the accumulating conveyers; driving motors connected to drive the helical input conveyer, the accumulating conveyers and the helical output conveyer; and a control system connected to receive signals from the position sensors and connected to provide output control signals to each of the displacing members and each of the driving motors.

\* \* \* \* \*